United States Patent [19]

Hand, Jr. et al.

[11] 4,395,956
[45] Aug. 2, 1983

[54] BIO-MASS BURNER WITH GRATE THEREFOR AND METHOD OF OPERATION

[75] Inventors: Calvin H. Hand, Jr., Rte. #3, Box 407, Tappahannock, Va. 22560; David J. Hand, Rte. #1, Box 140A, Warsaw, Va. 22572; John A. Careatti, Rte. #1, Box 154, Howertons, Va. 22475

[73] Assignees: Calvin H. Hand, Jr., Tappahannock; David J. Hand, Warsaw; John A. Careatti, Howertons; Herbert J. Mulqueen, Jr., Tappahannock, all of Va.

[21] Appl. No.: 351,267

[22] Filed: Feb. 22, 1982

Related U.S. Application Data

[62] Division of Ser. No. 159,226, Jun. 13, 1980, Pat. No. 4,341,199.

[51] Int. Cl.³ ............................ F23B 5/00; F23K 3/00
[52] U.S. Cl. ..................................... 110/235; 110/210; 110/214; 110/248; 110/254
[58] Field of Search ............... 110/347, 210, 214, 203, 110/247, 248, 254, 235; 126/163 A, 77

[56] References Cited

U.S. PATENT DOCUMENTS

| | | | |
|---|---|---|---|
| 3,610,179 | 10/1971 | Shaw, Jr. | 110/214 |
| 3,780,674 | 12/1973 | Liu | 110/248 |
| 4,037,543 | 7/1977 | Angelo | 110/214 |
| 4,123,979 | 11/1978 | Tesch | 110/214 |
| 4,334,484 | 6/1982 | Payne et al. | 110/210 |
| 4,356,778 | 11/1982 | McRee, Jr. | 110/212 |

Primary Examiner—Henry C. Yuen
Attorney, Agent, or Firm—Richard P. Matthews

[57] ABSTRACT

A bio-mass burner having a continuous feed on demand to a first combustion chamber that contains a hollow grate structure. The novel method of operation includes the use of at least one venturi tube which is in fluid communication with the hollow grate structure to establish an air flow into a second combustion chamber. Primary air to support combustion in the first chamber is supplied to the underside of the grate structure. Secondary air to support combustion in the second chamber is supplied through the hollow grate structure and then to the venturi tube in a sufficiently tortuous path through the first combustion chamber to insure that the air is superheated at the outlet of the venturi tube. A baffle arrangement in the first combustion chamber directs the fuel product toward the grate structure and assists in preventing any unburned gases from being ejected into the atmosphere.

7 Claims, 7 Drawing Figures

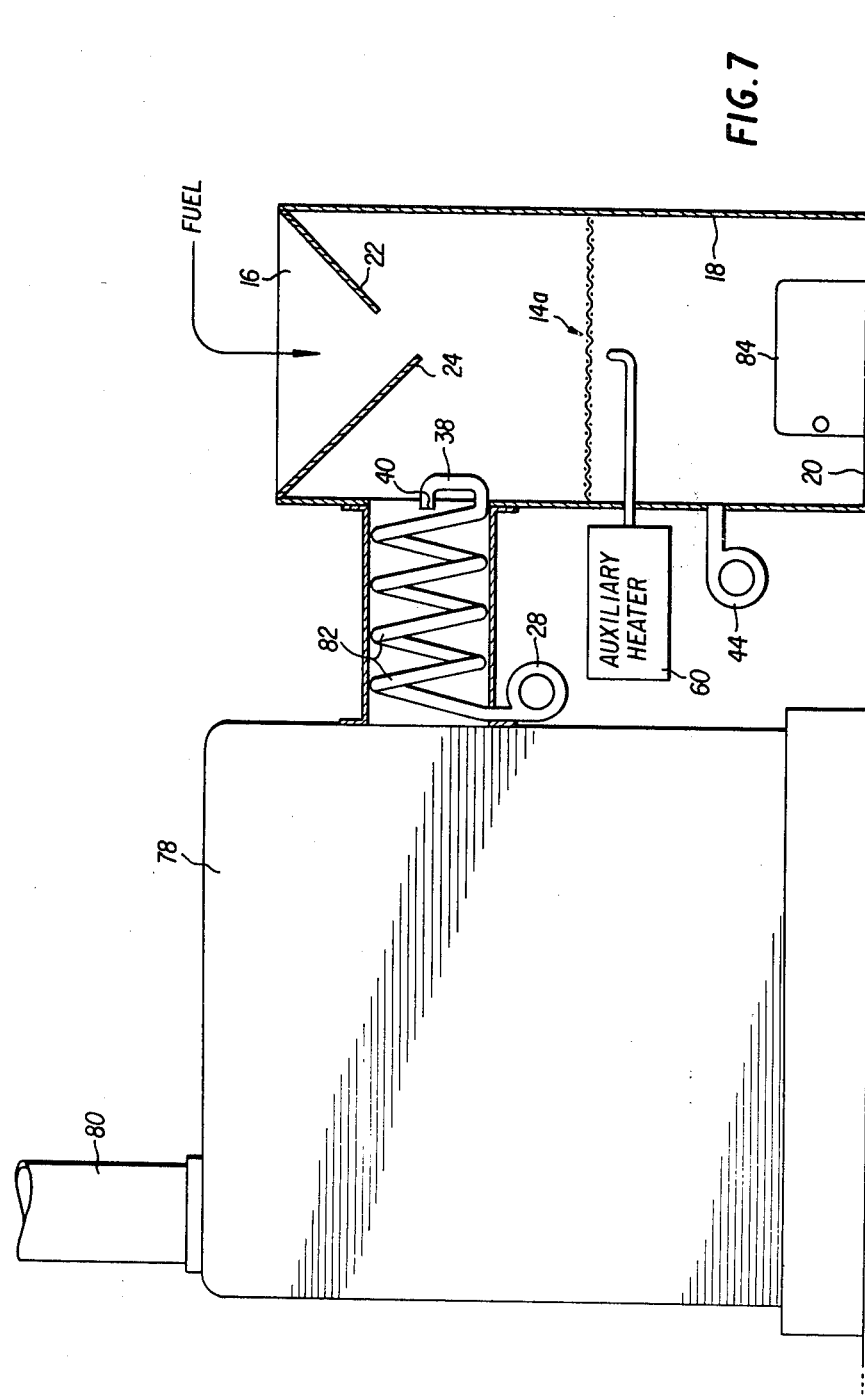

BIO-MASS BURNER WITH GRATE THEREFOR AND METHOD OF OPERATION

This is a division of application Ser. No. 159,226, filed June 13, 1980, U.S. Pat. No. 4,341,199.

This invention relates to a bio-mass burner construction provided with a unique grate structure which permits substantially smokeless operation and, more particularly, to such a burner and method of operation which will solve many of the current energy problems brought about especially by the rapid rise in the price of fuel oil.

BACKGROUND OF THE INVENTION

Heretofore it has been quite common to use fuel oil as a source of energy because of its relative abundance and relatively inexpensive price. The almost meteoric price rises within the past decade have put an end to this condition and necessitated a search for alternate sources of fuel. The present invention, while not meeting all the world's energy needs, does satisfy a substantial number of them, particularly in industrial and residential heating requirements. The invention, however, is not limited to the aforementioned specific uses since it may be widely used wherever an inexpensive fuel product is required.

SUMMARY OF THE INVENTION

In particular, the present invention utilizes a bio-mass fuel product which may be varied substantially in size, moisture content and heat content. Sawdust, for example, makes an excellent fuel and has been burned quite successfully in the burner of the present invention. Many other fuel products such as wood chips, wood pellets and pulverized coal may be used. All sorts of agricultural products, normally deemed to be waste products, may be used. For example, shredded corn stalks, shredded straw, shredded soy bean stems, shredded tobacco stems and hulls, and peanut hulls may be used just to mention a few. The reason for shredding these agricultural products is to make them easier to feed continuously on demand to the burner of the present invention. Thus the term "bio-mass" is used to describe these readily available biologically oriented and derived fuel products. The invention is deemed to be applicable to all known solid fuels necessitating only accommodating changes in feeding the product to the burning chamber and supporting it therein for combustion.

The present invention contemplates that the bio-mass fuel product will be fed substantially continuously on demand to the burner. As far as determining the demand, the controls necessary to start and stop the feeding, to start and stop the sources of primary and secondary air and to start and stop any auxiliary heating means are all deemed to be conventional, within the known state of the art, and do not form a part of the present invention. Also the term "air" is used herein merely to indicate a source of oxygen which will support combustion and is to be construed in its broadest context so as not to exclude the metering of gases, including oxygen, which will support combustion.

In the preferred form of the burner construction of the present invention, a bio-mass fuel product as previously defined is fed continuously on demand to the top of a first combustion chamber where it is directed by baffle means toward a novel grate structure. The grate itself has crisscrossed tubular members extending between opposing manifolds so as to support the fuel product. If the fuel itself is sufficiently crushed or pulverized so as to sift between the tubular members of the grate structure, an auxiliary or supplemental grate in the form of expanded metal, for example, may be used to insure containment of the fuel for combustion. Means are employed for supplying primary air under pressure to the underside of the grate means so as to support combustion within the first combustion chamber.

A unique application of a venturi tube is employed to receive secondary air which is supplied to the hollow grate structure and to direct the secondary air into a secondary burning chamber. This secondary air is superheated by the time it reaches the second combustion chamber after passing through the hollow nonporous tortuous path of the grate means. Auxiliary means may be employed to preheat the grate bringing it up to temperature so that ignition occurs in the first and second combustion chambers without producing any substantial quantity of smoke at the outlet stack. The venturi tube means cooperates with the baffle structure to create a decrease in pressure beneath the baffle arrangement whereby any as yet unburned products of combustion are directed into the secondary burning chamber. The fuel product is fed by any suitable means substantially continuously on demand into the top of the first burning chamber and the rate of combustion equals the rate of feed of the fuel product.

The novel steps of the method of the present invention will be evident upon considering the following principal steps thereof:

1. feeding a bio-mass fuel substantially continuously on demand into a first combustion chamber;
2. feeding that fuel product by gravity onto a grate structure positioned within the first combustion chamber, the grate structure being hollow and having nonporous walls;
3. providing a primary source of air to the underside of the grate structure;
4. establishing a flow of unburned products of combustion from the first combustion chamber to a second combustion chamber;
5. and providing a secondary source of air in the second combustion chamber with the secondary air being heated sufficiently to cause re-ignition of any unburned products of combustion in the second combustion chamber.

Additional steps of the method invention include the superheating of the secondary source of air in the first combustion chamber, positioning baffle means for redirecting the fuel product toward the grate structure and for impeding the flow of smoke from the first combustion chamber, passing the secondary air through the hollow, non-porous grate structure, and using a venturi tube which is in fluid communication with the outlet of the hollow grate structure in order to establish the flow of unburned products of combustion from the first combustion chamber to the second combustion chamber.

The inherent advantages and improvements of the present invention will become more readily apparent upon considering the following detailed description of the invention and by reference to the drawings wherein:

FIG. 7 is a fragmentary elevational view, schematic in nature, illustrating a modified form of the present invention.

Figure 1:
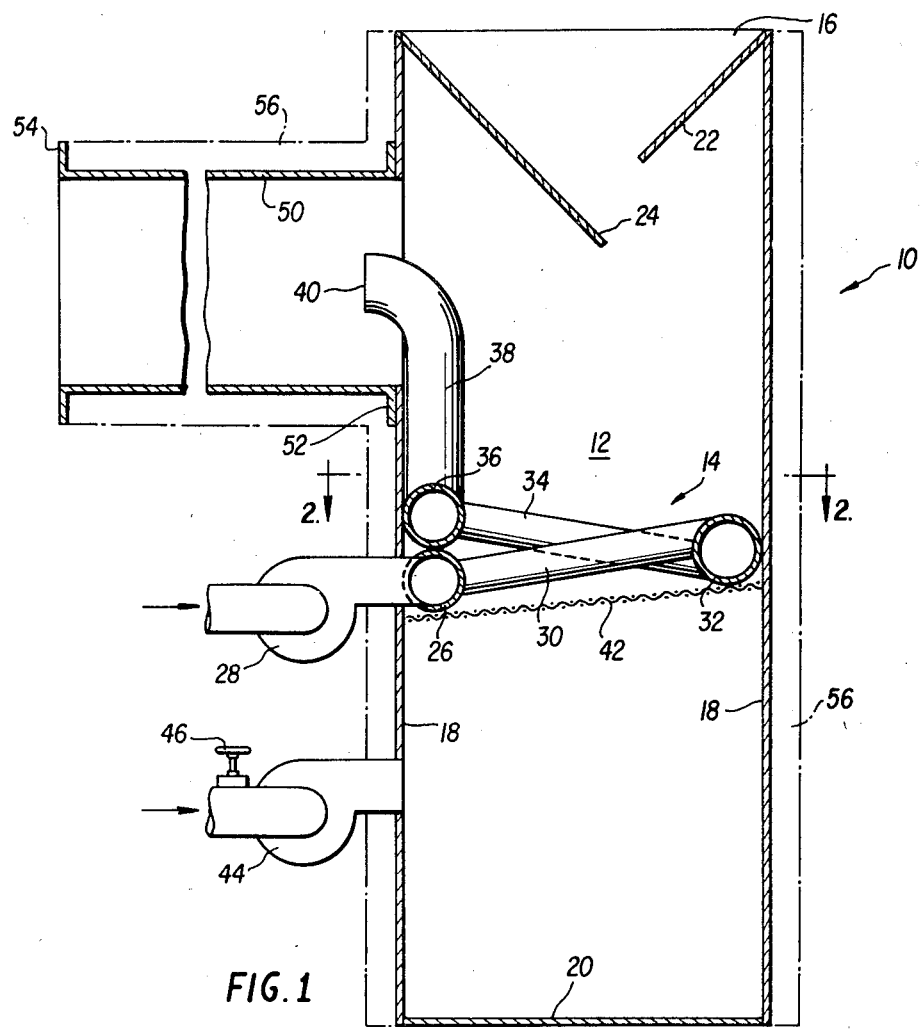
FIG. 1 is an elevational view taken in vertical cross section illustrating the burner construction and grate means therefor of the present invention.
Figure 2:
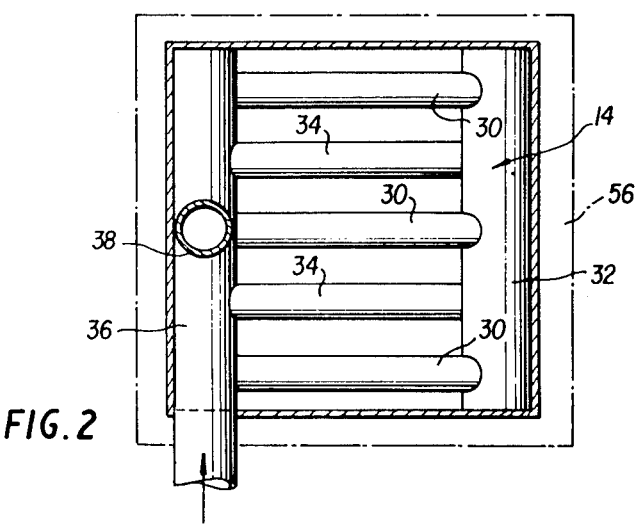
FIG. 2 is a plan view taken in horizontal cross section along line 2—2 of FIG. 1.

Referring now to FIGS. 1 and 2 of the drawings, a burner is indicated generally at 10 which provides a first combustion chamber 12 for a bio-mass fuel product. Hollow grate means are suitably supported within the first combustion chamber 12 and designated generally by the numeral 14. The burner 10 is illustrated to have an open top 16 through which the fuel product may be supplied by gravity feed. The chamber 12 has opposed side walls 18 and a bottom 20.

Adjacent the top of the combustion chamber 12 are downwardly and inwardly projecting baffle means 22, 24. These baffle means direct a fuel product which is supplied to the burner by any suitable means, preferably continuously on demand, toward the grate structure 14.

As seen both in FIGS. 1 and 2, the grate structure 14 comprises a first manifold 26 which is supplied with air under pressure from a fan 28 located exteriorly of the burner 10. A first set of tubes 30 extend upwardly and transversely to a second manifold 32 which is adjacent an opposed side wall 18. A second set of tubes 34 extend transversely in the reverse direction and upwardly in fluid communication with a third manifold 36 which is preferably located above the first manifold 26. A venturi tube 38 in fluid communication with the third manifold extends upwardly and has an end portion thereof 40 which extends into an outlet tube 50.

When the fuel product is sufficiently pulverized or comminuted so as to sift between the spaces of adjacent tubes 30, 34 of the grate structure 14, it is desirable to use a supplemental grate 42 to contain the fuel for combustion. One such supplemental grate 42 was made from expanded metal. A source of primary air is supplied under pressure by means of a fan 44 with the quantity of air being varied by the setting of suitable valve means 46.

The outlet tube 50 which defines at least the beginning of a secondary combustion chamber or zone is attached to the wall 18 so as to align an aperture in the wall 18 with the diameter of the outlet tube 50. An inner flange 52 facilitates bolting of the outlet tube to the burner 10. The outlet tube 50 is further provided with an outer flange 54 which is conveniently bolted onto another burning chamber such as is shown at 78 in FIG. 7. In the first working model of the present invention, the entire exterior of the burner 10 and outlet tube 50 were covered with an insulation material 56 such as Kaowool. Any suitable insulation material can be used to be certain that the burner retains its heat and this insures that the fuel product will burn. Also in the first working model a single fan with two outlets was used in place of fans 28, 44.

Figure 3:
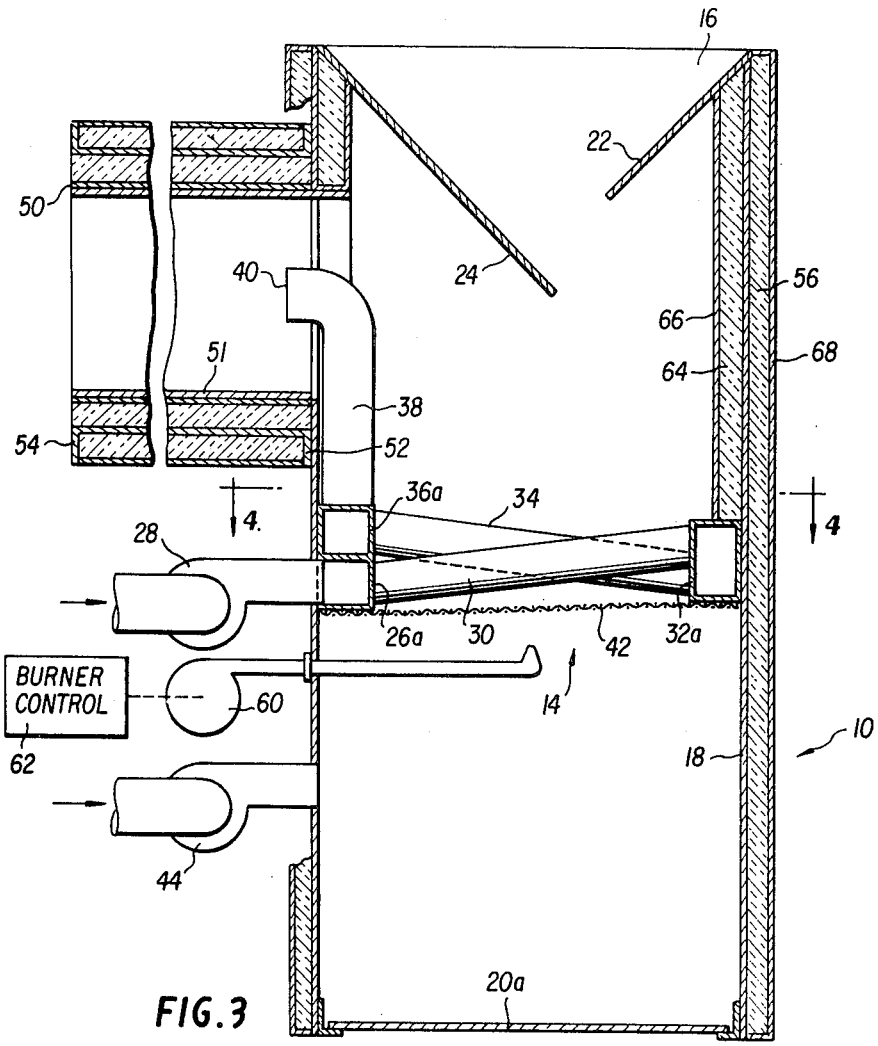
FIG. 3 is an elevational view taken in vertical cross section showing a modified form of the burner construction and grate means therefor.
Figure 4:
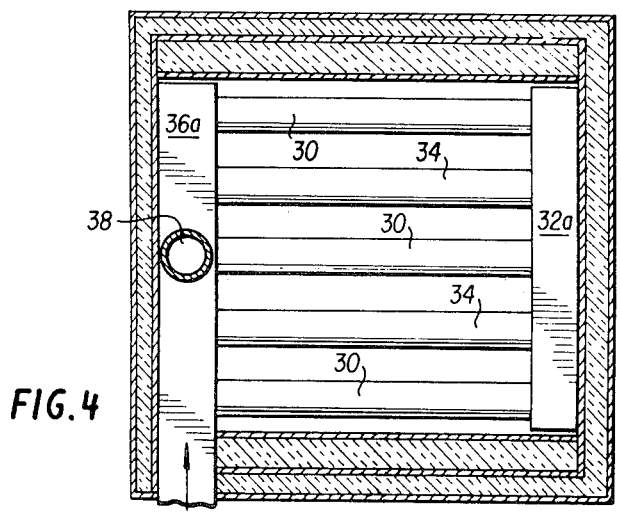
FIG. 4 is a plan view taken in horizontal cross section along line 4—4 of FIG. 3.

Referring now to FIGS. 3 and 4, a more commercial form of the invention is illustrated for the burner 10. In particular, the grate construction 14 in these figures is preferably made from rectangularly-shaped manifolds such as are shown at 26a, 32a, and 36a. The sets of tubes 30, 34 remain circular in cross section and provide the desired tortuous path from the source of secondary air provided by fan 28 leading from the first manifold 26a through the second manifold 32a via the set of tubes 30 and then back to the third manifold 36a by means of the set of tubes 34. This arrangement is most clearly illustrated in FIG. 5.

Because many of the fuel products have an ignition temperature in excess of 400° F., it is necessary to bring the temperature level within the grate to that temperature as rapidly as possible, especially if it is desired to avoid smoking of the burner. For this purpose, a pre-heater or auxiliary burner 60 is employed with suitable controls 62 to recycle the auxiliary burner and start it and stop it as desired. The use of controls 62 may include cadmium cells or the like which sense whether or not there is a flame in the grate structure 14 and if so the auxiliary or pre-heater burner is turned off. For example, if an oil burner is used, it may have as small a tank as five gallons to work satisfactorily for this purpose. Other fuels can be used in place of an oil burner and they include methane, propane, ethane, natural gas and others. However, propane may tend to accumulate in the bottom of the burner 10 and is not preferred.

Figure 5:
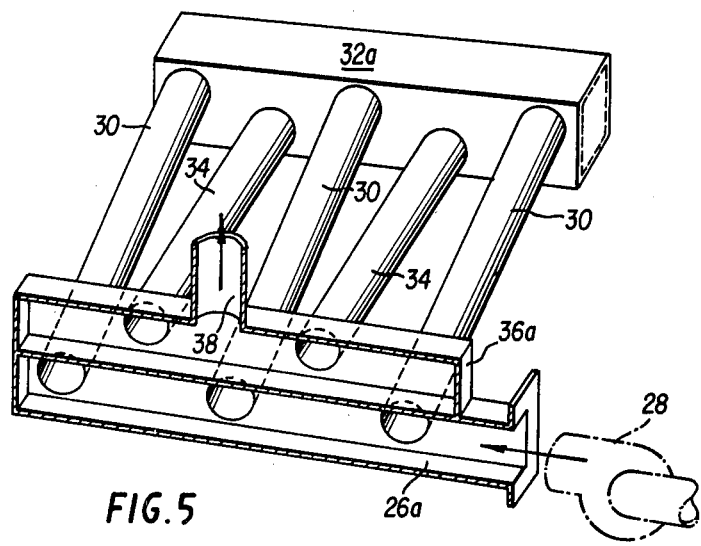
FIG. 5 is a perspective view illustrating the grate means of FIG. 3.

In the commercial model illustrated in FIGS. 3–5 inside insulation also in the form of Kaowool is shown at 64 and a metal covering is shown at 66. The exterior of the unit is also insulated again with Kaowool at 56 and a sheet metal trim 68 is used for a more pleasing appearance. To provide longer wearing characteristics, a ceramic lining 51 or stainless steel or other non-reactive lining may be used to line outlet tube 50.

Figure 6:
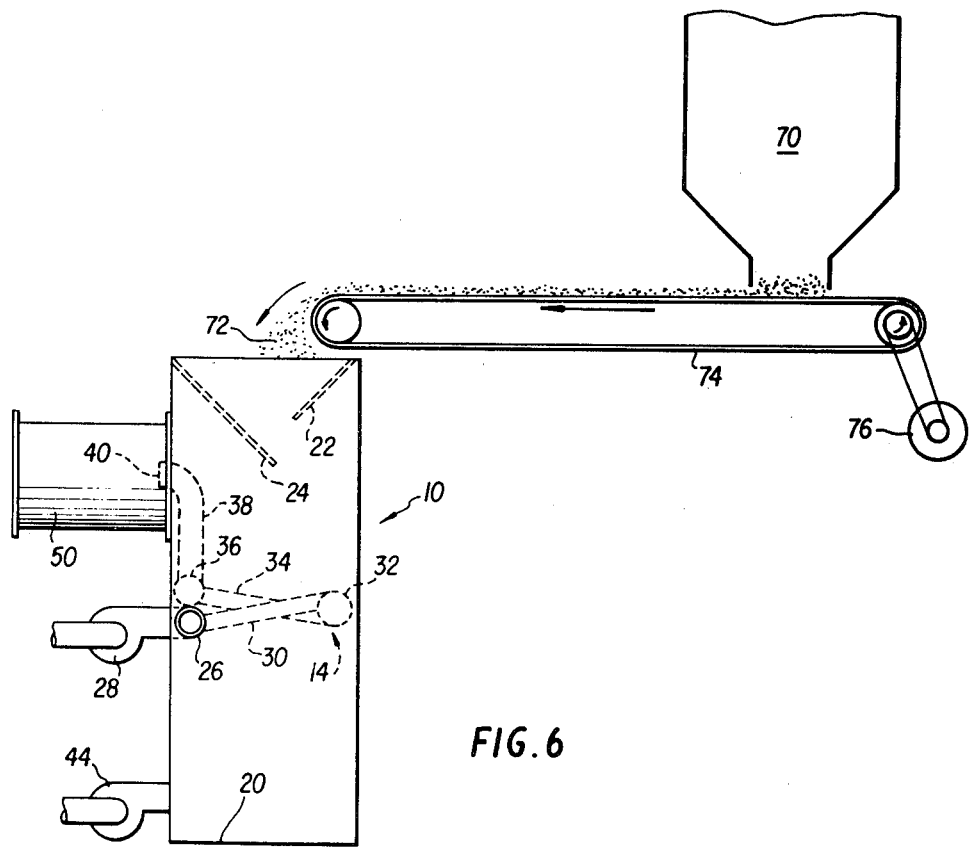
FIG. 6 is an elevational view, schematic in nature, illustrating the means for feeding the fuel product to the burner construction of the present invention.

In both embodiments previously illustrated and described, a fuel product is preferably fed continuously on demand from a source of fuel such as from a hopper or bin 70 illustrated in FIG. 6 onto a suitable feeding means with fuel product being shown at 72. A conveyor 74 is illustrated with a suitable drive means 76 for the sprockets of the conveyor. Such a device was actually used in the original model; however, a screw feed device or any other suitable feed means may be employed. In addition, it may be desirable to agitate the fuel 72 within the hopper or bin 70 so as to prevent coalescing or bridging of fuel within the hopper or bin 70.

Thus, in operation, fuel 72 is fed substantially continuously on demand from a bin 70 by means of feed means 74 until the fuel falls by gravity into the top of burner 10 directed by baffle means 22, 24 onto the grate structure 14. The crisscross arrangement of the sets of tubular members 30, 34 together with any auxiliary grate as needed contains the fuel product in a first combustion zone within the burner 10. Primary air is supplied under pressure by means of fan 44 to the underside of grate 14 and secondary air is supplied by means of fan 28 to the first manifold 26 then transversely through the first set of tubes 30 to a second manifold 32, then through the second set of tubes 34 to a third manifold 36, and then finally through the venturi tube 38 which has its outlet 40 directed toward the second combustion zone which begins in the outlet tube 50 and may continue in an expanded chamber such as the chamber provided by an oil burner such as is shown at 78 in FIG. 7. That is to say, the present invention may also be used to retrofit existing oil burner constructions by simply taking out the fuel nozzle arrangement in the burner construction and attaching the outlet tube 50 thereto with the aid of flange 54. Ignition temperatures for bio-mass fuel products having a lower ignition range of 450° F. to 500° F. up to about 800° F., principally depending upon the amount of moisture content, must be reached to permit full combustion of the bio-mass fuel product. When this occurs, there is a roar-like sound emitted from the burner construction.

In FIG. 7 an oil burner is illustrated at 78 without the burner nozzle employed and the unit of FIGS. 3-5 bolted thereto. The oil burner is shown with a suitable stack means 80. In the embodiment shown in FIG. 7, the fan 28 supplies secondary air to a coil 82 which is spirally wound around the inside of the outlet tube 50, and connected to the venturi tube 38 whose outlet 40 is directed toward the second combustion zone. Thus, the heat of combustion of the products passing through the outlet tube 50 is used to superheat the air within coil 82. A conventional grate 14a is employed with the fan 44 providing primary air to the conventional grate 14a. While it is possible to wind coil 82 exteriorly of outlet tube 50 and to have it connected in fluid communication with venturi tube 38, this modification is less efficient than that shown. A suitable access to ashes may be provided such as a door 84.

A number of other modifications can be made from the structure illustrated in the drawings. Thus, it is possible to use a plurality of venturi tubes 38 to supply secondary air depending upon the desired output in BTU per pound. Also heating jets may be used in the outlet tube 50 in place of the hollow grate construction and venturi tube arrangement. Also the venturi tube can be a nozzle so as to increase the velocity of the secondary air.

It is desirable to provide an excess of air both for the primary combustion and the secondary combustion. Thus, the undergrate air may be 125% in excess of that required and the secondary air may be in the order of magnitude 200% of excess air. This insures smokeless operation of the burner following ignition. In the original construction of this burner, a single fan supplied both the primary and secondary air. It was found, however, that a substantial pressure had to be employed so that the secondary air was sufficient to travel through the tortuous path provided by the hollow grate and still provide sufficient air at the outlet 40 of the venturi tube 38 to provide complete combustion of the unburned products. Similarly, a four inch diameter tube was initially used for outlet tube 50 and this did not work. A six inch diameter tube did work and larger diameter tubes may have to be employed depending upon the feed rate and the amount of air required to complete combustion in the secondary combustion zone. Also as has already been mentioned a plurality of venturi tubes may be employed to increase the secondary air directed into the secondary heating zone.

With a feed rate of about 60 pounds per hour approximately 420,000 BTU per hour is produced by the burner construction of the present invention using wood as the bio-mass fuel product. The quantity of air required is directly proportional to the rate of feed. Also the taller stack employed on the burner in which the secondary combustion occurs the more suction is provided and therefore less undergrate air is required.

The burner unit itself may be quite compact. In the original model the unit was 36 inches tall and length and width dimensions of 12 inches each. Larger sizes may be employed for achieving greater BTU outputs.

While presently preferred embodiments of the invention have been illustrated and described, it will be recognized that the invention may be otherwise variously embodied and practiced within the scope of the claims which follow.

What is claimed is:

1. A high temperature burner construction for solid fuel having a low ash content comprising
   a. a first chamber for burning a bio-mass fuel product,
   b. grate means within said first chamber for supporting a bio-mass fuel product,
      (1) said grate means being hollow with imperforate walls,
   c. means for feeding a bio-mass fuel product substantially continuously on demand into said first chamber at a rate of feed equal to the rate of combustion,
   d. means for supplying air under a pressure greater than atmospheric pressure to the underside of said grate means to support combustion within said first chamber,
   e. a second chamber in fluid communication with said first chamber for burning any unburned products of combustion from said first chamber,
   f. means for directing any unburned products of combustion from said first chamber to said second chamber and for establishing a reduced pressure zone above said grate means,
   g. and means for supplying an additional supply of air to said second chamber under a pressure in excess of atmospheric pressure and in excess of the amount of air needed to complete combustion in said second chamber,
      (1) said additional supply of air being applied through said hollow imperforate walled grate means and being superheated when it reaches said second chamber.

2. A burner construction as defined in claim 1 including baffle means for directing said fuel product toward said grate means and for assisting in the prevention of unburned products of combustion from being ejected into the atmosphere.

3. A burner construction as defined in claim 1 wherein said fuel is gravity fed from said feed means to said grate means.

4. A burner construction as defined in claim 1 wherein said means for directing any unburned products of combustion from said first chamber to said second chamber includes venturi tube means located at least partially within said first combustion chamber and having an outlet directed toward said second combustion chamber.

5. A burner construction as defined in claim 1 including auxiliary heating means within said first combustion chamber to heat said grate after periods of nonuse.

6. In a high temperature bio-mass burner for solid fuel having a low ash content of the type having a first combustion chamber with a gravity feed of said solid fuel product to a grate means within said first combustion chamber, said solid fuel being fed substantially continuously at a rate of feed equal to the rate of combustion, means for supplying primary air under a pressure greater than atmospheric pressure to the underside of said grate means to support combustion within said first combustion chamber and a second combustion chamber in fluid communication with said first combustion chamber, the improvement which comprises a venturi tube means,
    said grate means being hollow with imperforate walls, said venturi tube means being in fluid communication with said hollow grate means and being positioned at least partially within said first combustion chamber, said venturi tube means further having an outlet directed toward said second combustion chamber for supplying pressurized secondary air superheated by passage through said hollow grate means and in excess of the amount of air needed to complete combustion in said second combustion chamber with the flow of said secondary air establishing a zone of reduced pressure above said grate means.

7. In a bio-mass burner as defined in claim 6 including the additional improvement which comprises baffle means within said first chamber for directing said fuel product toward said grate means and for assisting in the prevention of unburned products of combustion from being ejected into the atmosphere.

* * * * *